A. A. CANTON.
SPEEDOMETER.
APPLICATION FILED JULY 1, 1914.
1,226,946.
Patented May 22, 1917.
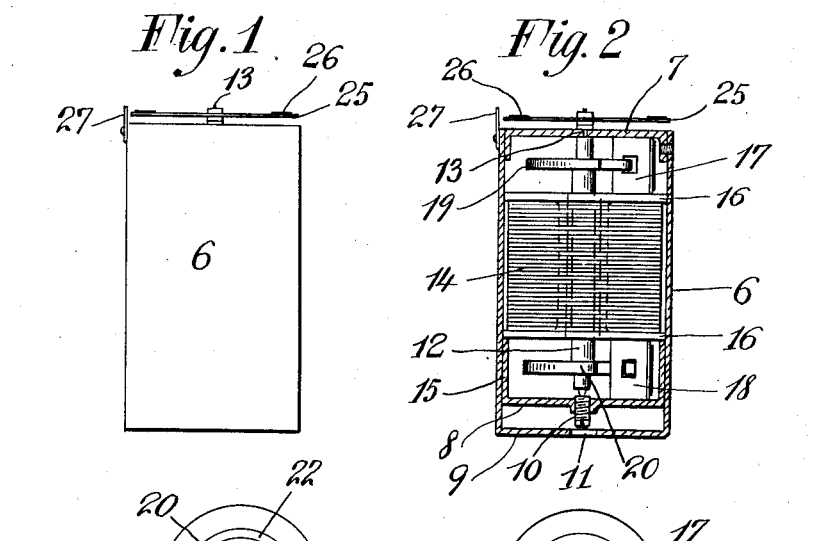
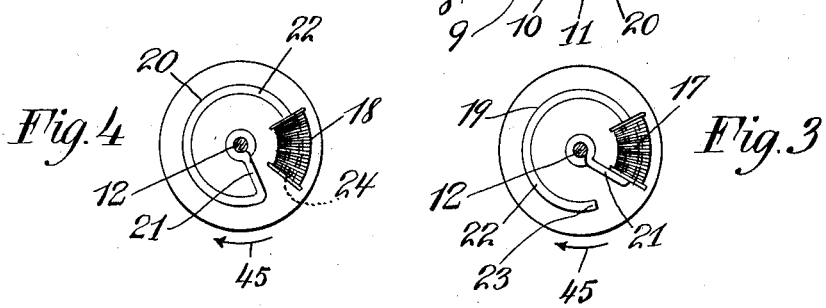
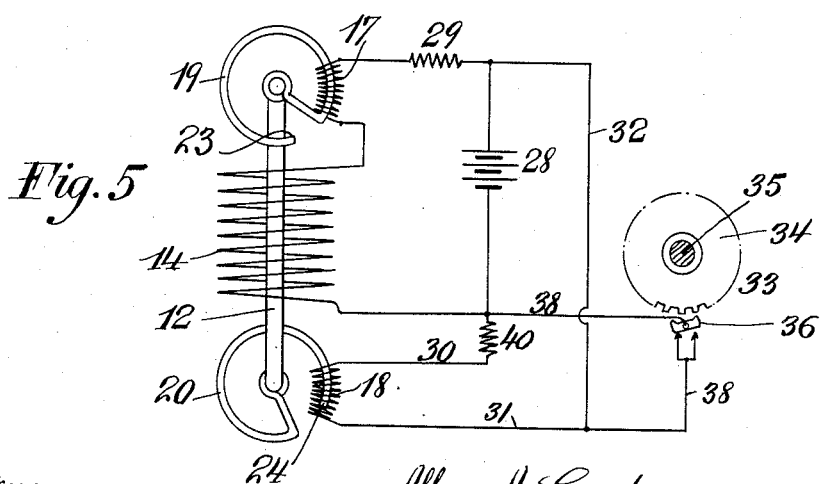
Witnesses
Henry J. Lucke
Allen A. Canton  Inventor
By his Attorney
Ivan E. A. Konigsberg

UNITED STATES PATENT OFFICE.

ALLEN A. CANTON, OF NEW YORK, N. Y., ASSIGNOR TO THE DEVICE TESTING COMPANY, A CORPORATION OF CONNECTICUT.

SPEEDOMETER.

1,226,946.   Specification of Letters Patent.   Patented May 22, 1917.

Application filed July 1, 1914. Serial No. 848,349.

*To all whom it may concern:*

Be it known that I, ALLEN A. CANTON, a citizen of the United States of America, and a resident of the city, county, and State of New York, have invented certain new and useful Improvements in Speedometers, of which the following is a specification.

This invention relates to speedometers. The object of the invention is to improve the construction of speedometers in general and to provide a small size speedometer having an indicating member capable of a wide range of movement so that the divisions or scale on said indicating member may be made quite large and easily readable.

Another object of the invention is to provide a speedometer capable of being operated with great accuracy and efficiency. Other objects will appear as this specification proceeds.

Accordingly, my invention is embodied in a speedometer comprising such elements and parts arranged and combined as hereinafter set forth and as illustrated in the accompanying drawing in which—

Figure 1 is an outside view of a speedometer embodying my invention.

Fig. 2 is a view of the mechanism with the casing in section.

Figs. 3 and 4 are top views of the upper and lower operating magnets respectively, and Fig. 5 is a wiring diagram.

The reference numeral 6 represents a casing which in this instance is in the form of a small cylinder having a removable top or cover 7. 8 is a bridge piece suitably secured near the bottom 9. 10 is a bearing screw in the bridge piece which may be adjusted from outside the casing through the opening 11 in the bottom 9. 12 is an iron spindle pivoted in said bearing screw 10 as shown. At the top the spindle is reduced materially as at 13 where it passes through an opening in the cover 7 and is centered and supported. The spindle acts as the core in an electromagnet the coil of which is marked 14. The spindle is free to turn within the coil.

The coil 14 is supported on the upturned flange 15 of the bridge 8 and held between the end supporting disks 16, 16. Above and below the coil and mounted on the disks 16 are the two solenoids 17 and 18 which are hollow and through which pass the pole pieces 19 and 20 secured to the spindle 12. The pole pieces comprise each a radial supporting arm 21 and a circular portion 22 ending in the poles 23 and 24 respectively and of course of opposite polarity. The pole pieces 19 and 20 are turned or swung in opposite directions as seen from Figs. 3 and 4, where the pole piece 19 is turned to the left ending in the pole 23 and the pole piece 20 is turned to the right ending in the pole 24. 25 is a scale disk secured to the spindle at the top and the scale 26 marked on said scale disk is read with reference to a suitable fixed point 27.

Referring to the diagram in Fig. 5, 28 represents a source of electric current such as a battery. The solenoids 17 and 18 are wound so as to have a tendency to repel the poles 23 and 24 respectively and the solenoids are further made of different magnetic strength, which may be done by making the solenoid 18 of a greater number of ampere turns than the solenoid 17, or as shown in Fig. 5, a resistance 29 may be inserted in series with the solenoid 17, which latter is connected across the battery 28 and in series with the coil 14.

The solenoid 18 is connected across the battery by wires 30, 31 and 32 and also to a magnetic interrupter 33 comprising a magnetized toothed disk 34, secured to the shaft 35 the speed of which is to be measured, and an armature 36 magnetized with a magnetism of opposite polarity to that of the disk 34. When the shaft 35 is at rest the solenoid 18 is shortcircuited as shown in Fig. 5 by way of the wires 32 and 38 from the one side of the battery, through the armature 36 of the interrupter and continued to the other side of the battery through wire 38. 40 is a resistance in the circuit to prevent shortcircuiting the battery.

It follows from the above description that when the shaft 35 is at rest, the solenoid 17 repels the pole 23 and operates or turns the spindle 12 into the position shown in Fig. 5 which is zero position of the scale 26 with reference to the point 27 as will be understood without any special illustration. The radial arm 21 strikes the solenoid 17 as seen in Fig. 3 and thus limits the movement of the spindle and the scale disk, which latter constitutes an indicating means for observing the movement of the spindle.

When the shaft 35 commences to rotate, the armature 36 is oscillated as is well known and whereby the circuit through wires 38 is opened and a current impulse passes from the battery through solenoid 18 energizing the latter. Successive current impulses through solenoid 18 caused by the frequent opening of the shortcircuiting circuit as explained builds up the magnetism in said solenoid 18 in proportion to the frequency of the impulses and solenoid 18 being energized repels the pole 24 of the magnet 19—12—20 and the spindle 12 is rotated in the direction indicated by the arrows 45 in Figs. 4 and 5 or in opposition to the direction in which the spindle is turned by the solenoid 17, it being understood that the parts are so timed and arranged that the periods of current impulse in said solenoid 18 are greater than the periods of interruption.

The faster the shaft 35 is rotated, the faster the current impulses pass through solenoid 18, and by means of the latter the spindle 12 is rotated in proportion to the frequency of the impulses as is obvious. Or in other words, the scale disk 25 fast on the spindle 12 accurately registers the speed of the shaft 35 inasmuch as it is rotated in proportion to the frequency of the current impulses through the solenoid 18 and this frequency is in direct proportion to the speed of the shaft 35.

The speed of the latter may thus be read on the scale 26 with reference to the fixed point 27.

It will be seen that the scale or indicating member has a relatively very large movement. In the instance illustrated the movement permitted by the radial arm 21 until it strikes the solenoid 18 in Fig. 4 is about 280 degrees more or less.

The speedometer as here shown and described is small, has but few parts and operates with great accuracy. The electromagnet 12—14 serves to strengthen and maintain the magnetism of the pole pieces 19 and 20 which may be considered separate small magnets operated by the solenoids 17 and 18.

The instrument is easily assembled or taken apart for repairs by simply taking off the scale disk and the cover 7 after which the mechanism may be lifted out of the casing.

It is understood that suitable provision is made for connecting the wires to the coils inside the casing, but as that is a matter of mere mechanical arrangement it is not shown.

I claim:—

1. A speedometer comprising a pair of solenoids of different magnetic strength, an electromagnet consisting of a fixed coil of wire and a movable core, said core having pole pieces at its opposite ends arranged to move in response to the difference in magnetic strength of the said two solenoids and means for supplying electric current to the said coil of wire and the said solenoids.

2. A speedometer comprising an electromagnet consisting of a fixed coil of wire and a movable core, said core having pole pieces at the opposite ends thereof and arranged, at right angles to the axis of the core, a pair of solenoids for operating said core, each of said solenoids mounted to influence one of the said pole pieces of the core and means for supplying current to the said coil of wire and the said solenoids.

3. A speedometer comprising an electromagnet, a core in the latter, circularly shaped pole pieces arranged at opposite ends of said core, a solenoid mounted at opposite ends of said electro-magnet and surrounding the said pole pieces and means for supplying electric current to said electro-magnet and the said solenoids.

4. A speedometer comprising an electromagnet, a pair of solenoids of different magnetic strength mounted at opposite ends of said electro-magnet, a core in the latter having pole pieces arranged to move within said solenoids and in response to the different magnetic strength thereof, means for supplying electric current to the said solenoids and the said electro-magnet and means for indicating the movement of the said movable core.

5. A speedometer comprising an electromagnet consisting of a coil and a movably supported core, said core having pole pieces at its opposite ends bent substantially circular and in parallel planes at right angles to the axis of the core, solenoids mounted at opposite ends of said electro-magnet and surrounding the said pole pieces, means for supplying said electro-magnet and one of the said solenoids with an uninterrupted electric current and means for supplying the other solenoid with current impulses at different frequencies.

Signed at New York, N. Y., this 30th day of June, 1914.

ALLEN A. CANTON.

Witnesses:
IVAN KONIGSBERG,
K. G. LE ARD.